United States Patent [19]
Bunker et al.

[11] Patent Number: 5,308,952
[45] Date of Patent: May 3, 1994

[54] WELDING ARC STABILIZER

[75] Inventors: Thomas A. Bunker; Kenneth A. Stanzel, both of Appleton, Wis.

[73] Assignee: Miller Electric Mfg. Co., Appleton, Wis.

[21] Appl. No.: 22,181

[22] Filed: Feb. 25, 1993

[51] Int. Cl.⁵ .............................................. B23K 9/073
[52] U.S. Cl. ............................ 219/130.4; 219/130.51
[58] Field of Search ........... 219/130.4, 160.51, 130.31, 219/130.32

[56] References Cited

U.S. PATENT DOCUMENTS

| | | | |
|---|---|---|---|
| 2,472,323 | 6/1949 | Welch, Jr. | 219/130.51 |
| 2,473,928 | 6/1949 | White | 219/130.4 |
| 2,659,036 | 11/1953 | Needham et al. | |
| 3,364,334 | 1/1968 | Sato et al. | 219/130.4 |
| 3,497,769 | 2/1970 | Stearns | 219/130.32 |
| 3,526,747 | 9/1970 | Keller et al. | 219/130.51 |
| 3,586,817 | 6/1971 | Manz | 219/130.4 |
| 3,594,541 | 7/1971 | Gorman | 219/130.4 |
| 3,598,954 | 8/1971 | Iceland et al. | 219/130.51 |
| 3,818,177 | 6/1974 | Needham et al. | 219/130.51 |
| 4,038,515 | 7/1977 | Risberg | |
| 4,371,776 | 2/1983 | Winn | |

OTHER PUBLICATIONS

Welding Handbook, 8th Ed., vol. 2, Welding Processes, American Welding Society, 1991 (Chapter 3).

Primary Examiner—Clifford C. Shaw
Attorney, Agent, or Firm—Foley & Lardner

[57] ABSTRACT

A welding arc stabilizer including a source of high voltage and a switch for switching the source of high voltage across the electrode and the workpiece in the event the arc rectifies. The high voltage is switched across the electrodes within the completion of the half cycle in which rectification occurred. The source of high voltage includes a resonant LC circuit. An arc sensing circuit, including a resistor, a capacitor, and a zener diode is provided in parallel with the arc. In the event the voltage applied to the electrode and workpiece exceeds the zener diode breakdown voltage, indicating the arc has rectified, an SCR disposed between the resonant circuit and one of the electrode and the workpiece is turned on, thus connecting the source of high voltage to the electrode and workpiece.

17 Claims, 2 Drawing Sheets

WELDING ARC STABILIZER

BACKGROUND OF THE INVENTION

1. Technical Field

The present invention relates generally to ac GTAW welding and, in particular, to a method and apparatus for stabilizing the arc when GTAW welding.

2. Background Art

Gas tungsten arc welding (GTAW), also called tungsten inert gas (TIG) welding, is a well known method for welding metals, in particular aluminum and magnesium. A description of GTAW, including the problems associated with welding aluminum and magnesium, may be found in *Welding Handbook*, Chapter 3, Gas Tungsten Arc Welding, pages 74–107, 1991, published by the American Welding Society.

It is well known in GTAW to use an ac squarewave power source, which is particularly suited for welding aluminum and magnesium. An ac squarewave power source provides an output having a straight polarity (electrode negative) half-cycle and reverse polarity (electrode positive) half-cycle, with a rapid transition between half cycles.

One such ac squarewave power source is described in U.S. Pat. No. 4,038,515, (the '515 patent) issued Jul. '515 patent provides an ac squarewave welding current output, with adjustable asymmetry or balance, i.e. the duration of the electrode positive and electrode negative half-cycles may be adjusted with respect to one another. As disclosed in the '515 patent it is desirable to provide such asymmetry control. The device disclosed by Risberg includes a four SCR bridge with an inductor in the dc leg, wherein current flows through the inductor in the same direction regardless of the direction of the current through the arc. In this manner, the inductor is able to provide a desirable rapid zero crossing to reduce arc rectification. However, the arc will still occasionally rectify. In particular, extinguishing of the arc (called arc rectification if the arc is extinguished on one of the half cycles on a recurring basis) or arc instability can occur when the current reverses to the electrode positive half cycle because of the difficulty in establishing a "cleaning" arc which has a higher voltage than a "welding" arc.

Another ac square wave power supply is described in U.S. Pat. No. 4,371,776, issued to Winn Feb. 1, 1983 (the '776 patent). The '776 patent also discloses a commutator circuit which is used on the electrode positive half cycle to maintain the arc as the polarity switches from electrode negative to electrode positive. The commutator circuit provides a high voltage on every such transition, not on as need basis.

It is also known to provide a high frequency overlay to assist in arc starting and arc stabilization. Such an overlay consists of applying a high voltage, low current signal at a high frequency across the arc. In the event of arc rectification, the high frequency signal provides a voltage sufficient to maintain or restart the arc on a half-cycle basis. The high frequency overlay may be applied only upon start-up, continuously, or as needed. When applied as needed, arc rectification is sensed and, after rectification has existed for several cycles, the high frequency component is supplied.

There are several problems with these high frequency systems. First, high frequency can provide undesirable noise which adversely affects the operation of control circuits, telecommunication equipment and computer equipment. Second, there has not yet been a practical way to provide an "as needed" high frequency arc stabilization that is able to restart the arc within the completion of one cycle. In other words, there is not a high frequency arc stabilization system that, upon sensing arc rectification, provides the high voltage signal to restart the arc within the half cycle in which the arc was rectified.

Accordingly, it is desirable to have an arc stabilization circuit that operates on an "as needed" basis. Such an arc stabilization system should be capable of providing a high voltage to the arc sufficient to restart the arc, and should be provided to restart the arc before the completion of the half cycle in which rectification occurred. Additionally, the use of high frequency should be avoided. Such a system should preferably be simple and inexpensive to manufacture.

SUMMARY OF THE INVENTION

According to one embodiment of the present invention, a welding arc stabilizer includes a source of high voltage and a switch for connecting the source of high voltage across the electrode and the workpiece in the event the arc rectifies. The high voltage is switched across the electrode and the workpiece within the completion of the half cycle in which rectification occurred.

According to a second embodiment of the present invention, a welding arc stabilizer includes a resonant LC circuit. A sensing circuit including a resistor, a capacitor, and a zener diode is provided in parallel with the arc. In the event the arc voltage exceeds the zener diode breakdown voltage, indicating the arc has rectified, an SCR disposed between the resonant circuit and either the electrode or the workpiece is turned on.

According to a third embodiment of the present invention, a method for stabilizing a squarewave arc output includes the steps of sensing the presence and absence of arc rectification and providing a high voltage signal across the electrodes within the completion of the half cycle in which rectification occurs, in the event rectification is sensed.

Figure 1:
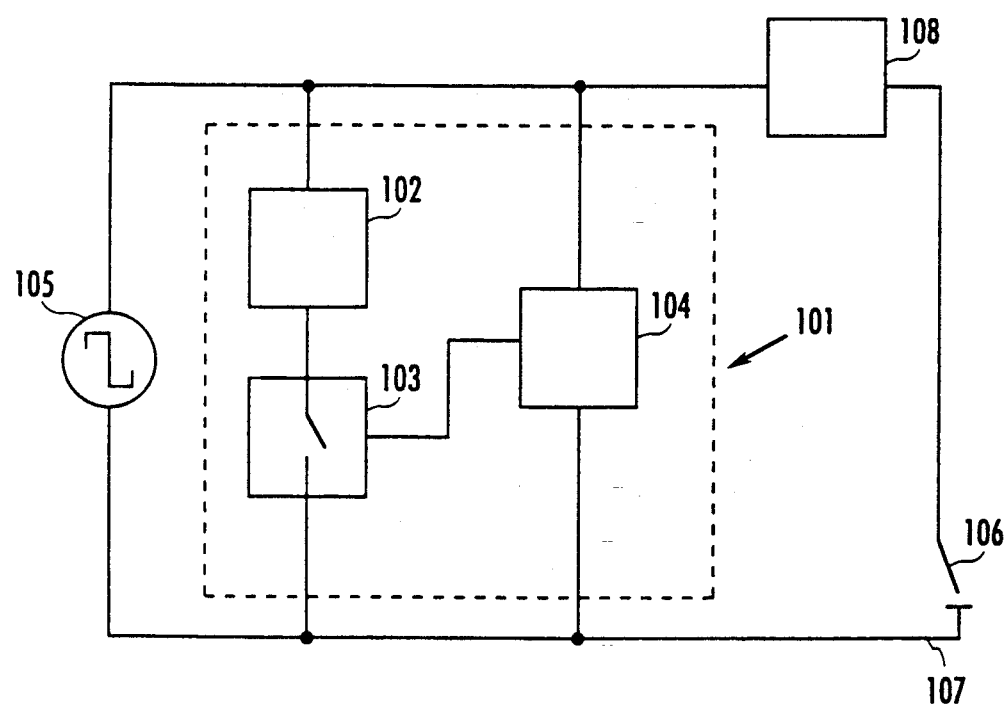
FIG. 1 is a block diagram of an arc stabilizer constructed according to the present invention.

Before explaining at least one embodiment of the invention in detail, it is to be understood the invention is not limited in its application to the details of construction and the arrangement of the components set forth in the following description or illustrated in the drawings. The invention is capable of other embodiments or being practiced or carried out in various ways. Also, it is to be understood the phraseology and terminology employed herein is for the purposes of description and should not be regarded as limiting.

DETAILED DESCRIPTION OF A PREFERRED EXEMPLARY EMBODIMENT

The present invention is directed primarily to a welding arc stabilizer for use in an ac welding power supply. The preferred embodiment will be described for use in a phase controlled ac squarewave welding power supply, but the invention is not limited to use in square wave power supplies. Referring now to FIG. 1, a welding arc stabilizer 101, constructed in accordance with the preferred embodiment of the present invention, includes a source of high voltage 102, a switch 103, and an arc sensing circuit 104. The arc stabilizer is used with a squarewave welding power supply 105 such as the power supply disclosed in U.S. Pat. No. 4,038,515, which is incorporated herein by reference. The output of squarewave power supply 105 is provided to an electrode 106 and a workpiece 107. An arc starter 108 is provided for starting the arc upon powerup. Arc starter 108 may be any known arc starter, such as a high frequency starter. The present invention allows for arc starter 108 to be used only on power-up and does not require it to be used during normal operation.

Squarewave power supply 105 provides squarewave current to electrode 106 and workpiece 107 and may or may not provide asymmetry control. During normal operation of a conventional squarewave supply, when the arc is not rectified, the voltage between electrode 106 and workpiece 107 is approximately 15 volts for electrode negative welding and approximately 25 volts for electrode positive cleaning. In the event the arc rectifies, the voltage applied to electrode 106 and workpiece 107 by squarewave power supply 105 increases to the open circuit output voltage of squarewave power supply 105, typically 110 volts peak. Arc sensing circuit 104 detects the increase in voltage and, after a delay, closes switch 103. This causes high voltage source 102 to be connected across electrode 106 and workpiece 107. High voltage source 102 then provides a voltage pulse sufficient to restart the arc, referred to herein as "high voltage." After the arc is restarted switch 103 is opened.

Figure 2:
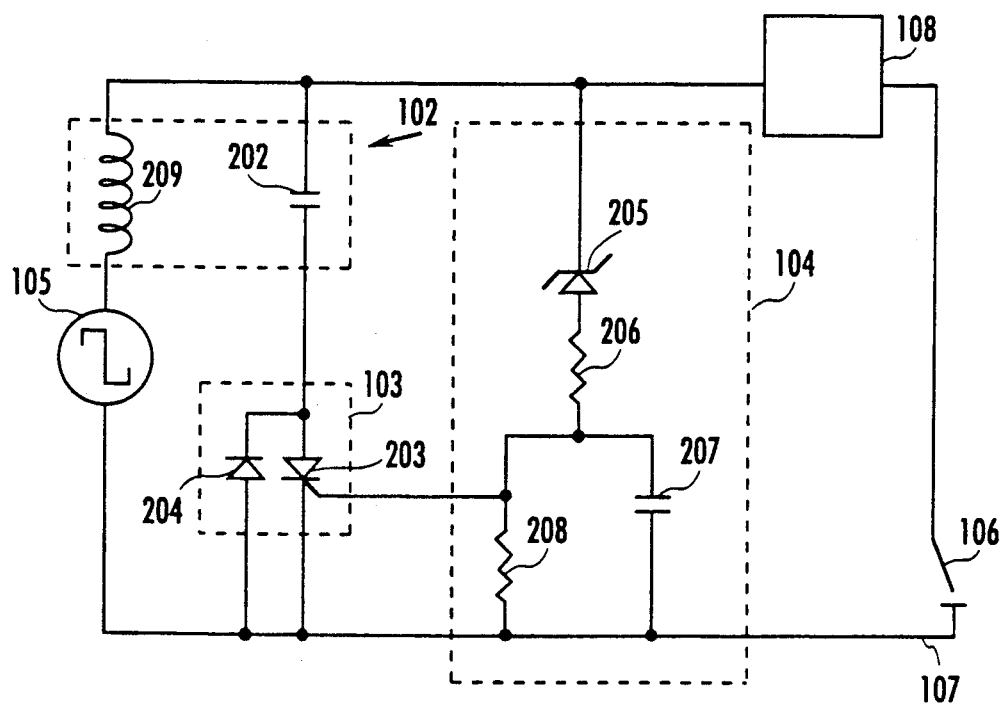
FIG. 2 is a circuit diagram of an arc stabilizer constructed according to the present invention.

Referring now to FIG. 2, the components used for the preferred exemplary embodiment of arc stabilizer 101 include a resonating capacitor 202, an switch such as an SCR 203, a reset diode 204, a voltage detector such as zener diode 205, a time delay circuit such as resistor 206 and capacitor 207, and a bias resistor 208. An inductor 209 is shown to represent the leakage reactance of squarewave power supply 105. The embodiment shown in FIG. 2 is provided specifically for the purpose of stabilizing an arc which rectifies during the transition to the electrode positive half cycle. Resonating capacitor 202 and leakage reactance 209 comprise high voltage source 102, shown in FIG. 1. The high voltage source shown in FIG. 2 is exemplary and other high voltage sources, such as a dc power supply, for example, that provide a voltage sufficiently high to restart the arc may be used. Using a welding power supply such as the one described in U.S. Pat. No. 4,038,515 and a tungsten electrode, a high voltage source of 120-165 volts is generally sufficient to restart the arc. The actual voltage may vary depending in part on the electrode size, the condition of the workpiece and the distance from the electrode to the workpiece. Switch 103 of FIG. 1 is implemented by SCR switch 203 in the embodiment of FIG. 2 but, as one skilled in the art will readily recognize, other types of controllable switches may be used to implement switch 103. In the exemplary embodiment of FIG. 2, resistors 206 and 208, capacitor 207 and zener diode 205 of FIG. 2 comprise arc sensing circuit 104 of FIG. 1. As one skilled in the art will recognize, any circuit that detects the absence of an arc, such as a voltage detector disposed across the electrode and workpiece, or a current detector disposed in series with an electrode, that is capable of causing a switch to be opened, is deemed an arc sensing circuit as used herein.

Referring again to FIG. 2, during the electrode negative half cycle of the output of power supply 105, resonating capacitor 202 is charged through reset diode 204 to approximately the electrode negative arc voltage (approximately 15 volts).

During normal operation capacitor 202 is prevented from discharging when the output of power supply 105 reverses because diode 204 blocks the reverse voltage and current flow.

The output voltage of power supply 105 is applied across electrode 106 and workpiece 107, and across arc sensing circuit 104, including the combination of resistor 206, zener diode 205, resistor 208 and capacitor 207. Zener diode 205 is chosen such that its breakdown voltage is less than the open circuit voltage of squarewave power supply 105, but greater than the electrode positive arc voltage (25 volts). Thus, as long as the arc does not rectify, zener diode 205 does not conduct during the electrode positive half cycle. However, when the arc rectifies the voltage applied across arc sensing circuit 104 rises to the open circuit voltage of about 110 volts peak, which exceeds the breakdown voltage of zener diode 205. Thus, zener diode 205 begins conducting and capacitor 207 is charged according to the RC time constant of resistor, 206 and capacitor 207. Resistor 208 provides the proper bias voltage to the gate of SCR 203. Accordingly, its resistance should be chosen in conjunction with the resistance of resistor 206.

If the open circuit voltage is maintained across electrode 106 and workpiece 107, the voltage across capacitor 207 rises, and after a delay determined by the RC time constant of resistor 206 and capacitor 207, to equal the turn on voltage of SCR 203. Thus, after a delay determined according to the RC time constant SCR 203 is turned on, creating a closed circuit including squarewave power supply 105, leakage reactance 209, resonating capacitor 202, and SCR 203. Resonating capacitor 202 resonates with leakage reactance 209 and rings up to twice the open circuit voltage plus the precharge voltage on capacitor 202. The voltage across capacitor 202 is applied to electrode 106 and workpiece 107 and, when it rings up to a sufficiently high voltage (about 120 to 165 volts for the preferred embodiment), restarts the arc. The ringing up is completed before the end of the electrode positive half cycle in which the arc rectified. Thus a high voltage pulse is provided to restart the arc prior to the completion of the half cycle in which the arc rectified. After the arc has been restarted resonating capacitor 202 starts its reverse ring back SCR 203 becomes reversed biased and is turned off, thus closing switch 103.

Capacitor 207 is provided to create a delay from the time at which rectification is sensed until SCR 203 is turned on. If the arc is established prior to the delay created by the RC time constant of resistor 206 and capacitor 207, the voltage across the arc sensing circuit will be equal to the electrode positive arc. This will not be sufficient to break down zener diode 205 and no current will flow through resistor 206 to capacitor 207. Thus, erroneous activation of the arc stabilization does not occur when welding at low currents, which often includes a zero current period of time. By appropriately choosing the values of resistor 206 and capacitor 207, an RC time constant may be chosen for the particular application of the arc stabilization circuit. In an alternative embodiment resistor 206 may be replaced with a variable resistance which allows the delay to be adjusted.

In addition to the embodiment shown arc stabilization circuit 101 could be reversed to provide stabilization for the electrode negative half cycle. Similarly, one arc stabilization circuit could be used for stabilizing the electrode negative half cycle and a second anti-parallel arc stabilization circuit could be used for stabilizing the electrode positive half cycle.

Other modifications may be made in the design and arrangement of the elements discussed herein without departing from the spirit and scope of the invention, as expressed in the appended claims.

We claim:

1. A welding arc stabilizer for an ac power supply capable of providing an arc drawn between an electrode and a workpiece, said arc having a plurality of positive and negative half cycles, comprising:
   - a source of high voltage disposed for application of high voltage to said arc in the event of its rectification, said high voltage derived from the ac power supply;
   - a switch in electrically operative association with said source of high voltage and at least one of said electrode and said workpiece, said switch including a control input; and
   - an arc sensing circuit in electrically operative association with the arc and the control input of the switch,
   - wherein, upon detection of arc rectification, said switch is closed within the completion of one-half cycle of the output and said high voltage is applied to said arc to stabilize it.

2. The welding arc stabilizer of claim 1 wherein the source of high voltage includes a resonant circuit.

3. The welding arc stabilizer of claim 2 wherein the resonant circuit includes an inductance provided by the power source.

4. The welding arc stabilizer of claim 2 wherein the inductance is provided by stray and leakage inductance of the power source.

5. The welding arc stabilizer of claim 1 wherein the arc sensing circuit includes a zener diode having a breakdown voltage, whereby the arc sensing circuit does not conduct unless the voltage between the electrode and the workpiece exceeds the breakdown voltage.

6. The welding arc stabilizer of claim 1 wherein the arc sensing circuit includes a delay circuit, wherein upon detected rectification, the delay circuit provides a delay before the switch is closed.

7. The welding arc stabilizer of claim 6 wherein the delay circuit includes a capacitance in electrically operative association with a resistance, the RC time constant of which establishes said delay.

8. The welding arc stabilizer of claim 1 wherein said switch is an SCR having a gate and said control input is the gate of the SCR.

9. The welding arc stabilizer of claim 1 wherein the arc sensing circuit includes means for sensing an arc rectification during one of said positive half cycles.

10. A welding arc stabilizer for an ac power supply wherein the arc is drawn between an electrode and a workpiece comprising:
    - a source of a high voltage pulse derived from the ac power supply, including a resonant circuit including an inductance in electrically operative association with a first capacitance;
    - a circuit, including a resistance, a second capacitance having a capacitor voltage and a zener diode having a breakdown voltage, in parallel with the arc, wherein the breakdown voltage is greater than the arc voltage; and
    - an SCR having a gate, the SCR being in electrically operative association with the first capacitance and at least one of said workpiece and said electrode, wherein the second capacitor voltage is applied to the gate.

11. The welding arc stabilizer of claim 10 wherein the inductance is provided by the power sources.

12. A method of stabilizing a square wave arc output having a plurality of cycles, the output being applied to an electrode and a workpiece, comprising the steps of sensing the presence or absence of arc rectification and deriving a high voltage signal from a welding current power supply, providing the high voltage signal between the electrode and the workpiece within the completion of one-half cycle of the output in the event a rectification of the arc is sensed.

13. The method of claim 12 wherein the step of providing a high voltage includes using the output of a resonant circuit to provide the high voltage between the electrode and the workpiece.

14. The method of claim 12 wherein the step of sensing includes the step of detecting the presence of a voltage across the electrode and the workpiece that exceeds a predetermined value.

15. The method of claim 12 wherein the step of providing a high voltage is performed subsequent to a delay after a rectification of the arc is sensed.

16. The method of claim 12 including the step of charging a capacitor, wherein the step of charging the capacitor is performed after an arc rectification is sensed and before the step of providing a high voltage is performed.

17. The method of claim 12 wherein the step of providing a high voltage includes gating an SCR.

* * * * *